United States Patent
Lee et al.

(10) Patent No.: US 11,541,590 B2
(45) Date of Patent: Jan. 3, 2023

(54) METHOD OF EXTRUSION BLOW MOLDING USING A LIQUID

(71) Applicant: Discma AG, Hünenberg (CH)

(72) Inventors: Darrel Lee, Saline, MI (US); Richard Sieradzki, Frankfort, IL (US)

(73) Assignee: DISCMA AG, Hünenberg (CH)

( * ) Notice: Subject to any disclaimer, the term of this patent is extended or adjusted under 35 U.S.C. 154(b) by 101 days.

(21) Appl. No.: 17/254,948

(22) PCT Filed: Jun. 27, 2019

(86) PCT No.: PCT/IB2019/000821
§ 371 (c)(1),
(2) Date: Dec. 22, 2020

(87) PCT Pub. No.: WO2020/003003
PCT Pub. Date: Jan. 2, 2020

(65) Prior Publication Data
US 2021/0146596 A1     May 20, 2021

Related U.S. Application Data

(60) Provisional application No. 62/691,702, filed on Jun. 29, 2018.

(51) Int. Cl.
*B29C 49/46* (2006.01)
*B29C 49/04* (2006.01)
(Continued)

(52) U.S. Cl.
CPC .............. *B29C 49/46* (2013.01); *B29C 49/04* (2013.01); *B29C 49/4278* (2013.01);
(Continued)

(58) Field of Classification Search
CPC ..... B29C 49/04; B29C 49/4278; B29C 49/46; B29C 49/4823; B29C 49/60;
(Continued)

(56) References Cited

U.S. PATENT DOCUMENTS 3,911,071 A    10/1975 Naumann
4,178,976 A *  12/1979 Weiler .................... B29C 49/58
                                                             215/377
(Continued)

FOREIGN PATENT DOCUMENTS

DE     102015012937 A1    4/2017
EP     2001648 A2         12/2008
(Continued)

*Primary Examiner* — Monica A Huson
(74) *Attorney, Agent, or Firm* — Michael E. Dockins; Shumaker, Loop & Kendrick, LLP (57) ABSTRACT

A method of making a container via a simultaneous filling and forming of the container with a liquid product is disclosed. The method comprises the steps of extruding a parison (12, 2), capturing a portion of the parison (12, 2) within a mold (15), and inflating the captured portion of the parison (12, 2) against the mold (15). The captured portion of the parison (12, 2) is inflated against the mold (15) by introducing the liquid product into an interior of the captured portion of the parison (12, 2), wherein the liquid product forms an end product to be sealed within the resultant container.

17 Claims, 6 Drawing Sheets

(51) Int. Cl.
  *B29C 49/42* (2006.01)
  *B29C 49/48* (2006.01)
  *B29C 49/60* (2006.01)
  *B29L 31/00* (2006.01)
(52) U.S. Cl.
  CPC .......... *B29C 49/4823* (2013.01); *B29C 49/60* (2013.01); *B29C 2049/465* (2013.01); *B29C 2049/4635* (2013.01); *B29C 2049/4838* (2013.01); *B29C 2049/6063* (2013.01); *B29L 2031/7158* (2013.01)
(58) Field of Classification Search
  CPC ........ B29C 2793/009; B29C 2049/465; B29C 49/36; B29C 2049/4838; B29C 49/58; B29C 2049/6661; B29C 49/80; B29C 2049/4664; B29C 2049/4635; B29C 2049/6063; B29C 49/72; B29C 2049/4602; B29C 49/32; B29C 2949/08; B29C 49/4273; B29C 2793/0054; B29L 2031/463; B29L 2031/7158; B29K 2067/003; B29K 2105/0044; B29K 2995/0067
  See application file for complete search history.

(56) References Cited

U.S. PATENT DOCUMENTS 4,539,172 A * 9/1985 Winchell ............... B65D 17/06
                                                         264/516
2011/0300249 A1   12/2011  Andison et al.

FOREIGN PATENT DOCUMENTS

| JP | S57123027 A | 7/1982 |
| JP | H08290465 A | 11/1996 |
| WO | 2015130428 A1 | 9/2015 |

* cited by examiner

METHOD OF EXTRUSION BLOW MOLDING USING A LIQUID

CROSS-REFERENCE TO RELATED APPLICATION

This patent application claims priority to U.S. Provisional Patent Application Ser. No. 62/691,702, filed on Jun. 29, 2018, the entire disclosure of which is hereby incorporated herein by reference.

FIELD OF THE INVENTION

The present invention relates generally to blow molding of a container and, more particularly, to the filling and sealing of an extrusion blow molded container.

BACKGROUND OF THE INVENTION

Many products that were previously packaged using glass containers are now being supplied in plastic containers, such as containers that are fabricated from polyesters, such as polyethylene terephthalate (PET), for example.

Plastic containers are typically manufactured using the well-known stretch blow molding process. This involves the use of a pre-molded preform having a threaded portion and a closed distal end. The preform is first heated and then is longitudinally stretched and subsequently inflated within a mold cavity so that it assumes the desired final shape of the container. As the preform is inflated, it elongates and stretches, taking on the shape of the mold cavity. The polymer solidifies upon contacting the cooler surface of the mold, and the finished hollow container is subsequently ejected from the mold.

Another conventional process for fabricating plastic containers is the extrusion blow molding process, in which a continuously extruded hot plastic tube or parison is captured within a mold and inflated against the inner surfaces of the mold to form a container blank. The mold is typically designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion.

The stretch blow molding process is the industry standard for forming plastic containers that are used to package consumer beverages as well as other materials. However, it has some inherent limitations. These include unsightly gate wells or discontinuities on the bottom portions of containers, and limitations on the possible spectrum of designs that can be realized using the stretch blow molding process, such as containers incorporating a handle or void space therein.

While extrusion blow molding processes have addressed a need for an improved plastic container that obviates some of the disadvantages that are inherent to containers that are fabricated using the stretch blow molding process, the extrusion blow molding processing requires a number of steps to form the container then later fill and cap the container. As a result, significant costs may be incurred while performing these processes separately. Thus, there is a need for a liquid or hydraulic blow molding system suitable for forming and filling a container in a single operation.

Further objects, features and advantages of the invention will become apparent from a consideration of the following description and the appended claims when taken in connection with the accompanying drawings.

SUMMARY OF THE INVENTION

Concordant and congruous with the present invention, a liquid or hydraulic blow molding system suitable for forming and filling a container in a single operation in an extrusion blow mold process has surprisingly been discovered.

In an embodiment of the invention, a method of making a plastic container comprises the steps of extruding a parison, capturing a portion of the parison within a mold, and inflating the captured portion of the parison against the mold. The captured portion of the parison is inflated against the mold by introducing the liquid product into an interior of the captured portion of the parison, wherein the liquid product forms an end product to be sealed within the resultant container.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The present invention discloses a method of forming a container utilizing an extrusion blow molding process. The disclosed method advantageously allows for the resultant container to be formed and filled with a liquid forming an end product disposed within the container, wherein the forming and filling of the container occurs during a common manufacturing process.

Figure 1:
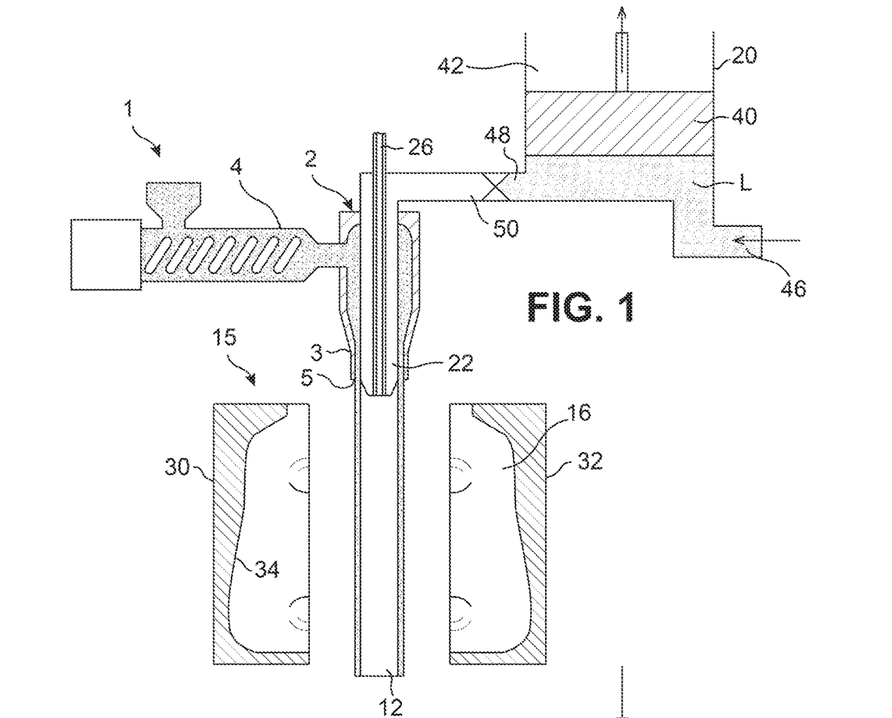
FIG. 1 is a partially schematic cross-sectional depiction of a system having an integrated extrusion die head and blow nozzle according to an embodiment of the invention.
Figure 2:
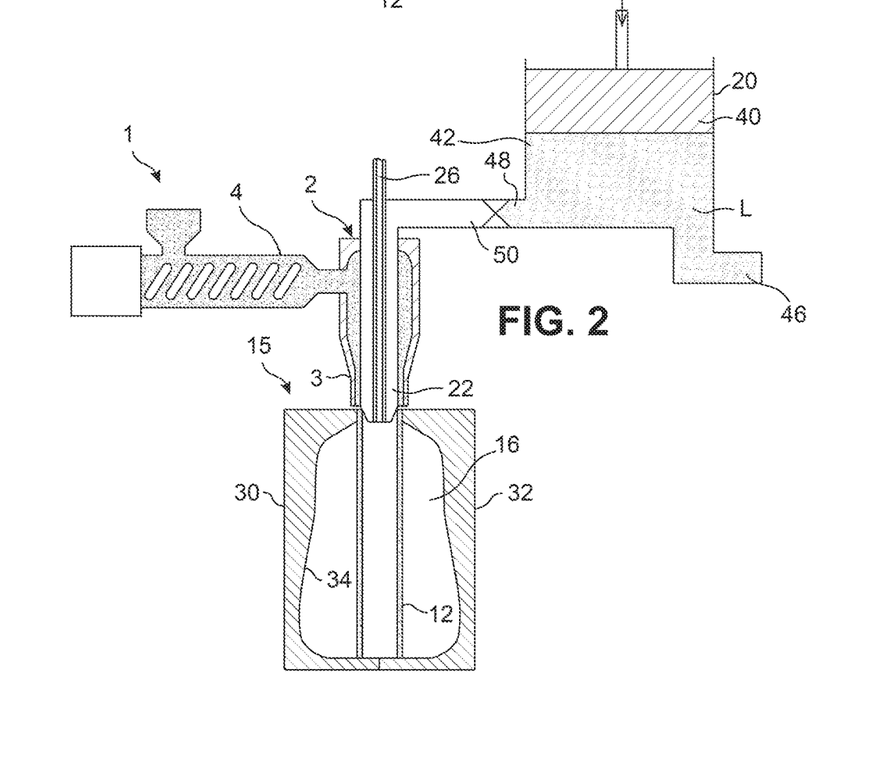
FIG. 2 is a partially schematic cross-sectional depiction of the system of FIG. 1 following a capturing of a portion of a parison within a mold and sealing engagement between the portion of the parison and the blow nozzle.
Figure 3:
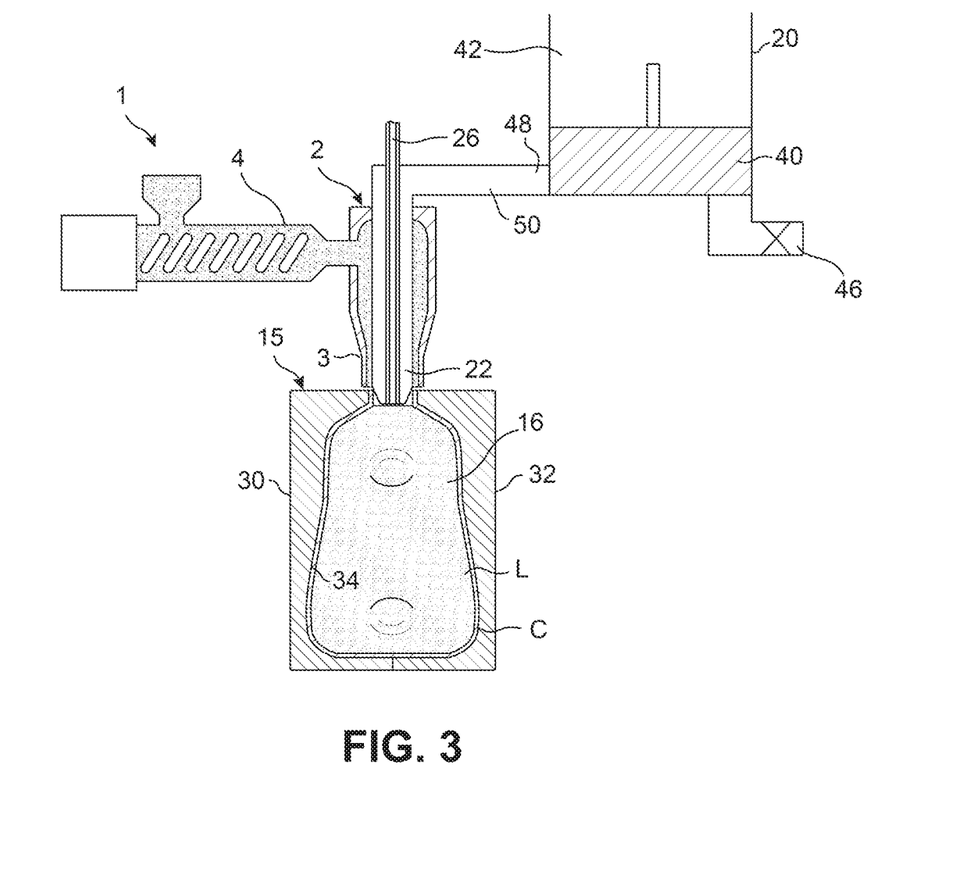
FIG. 3 is a partially schematic cross-sectional depiction of the system of FIG. 2 following an inflating of the captured portion of the parison against the mold via introduction of a liquid through the blow nozzle.
Figure 4:
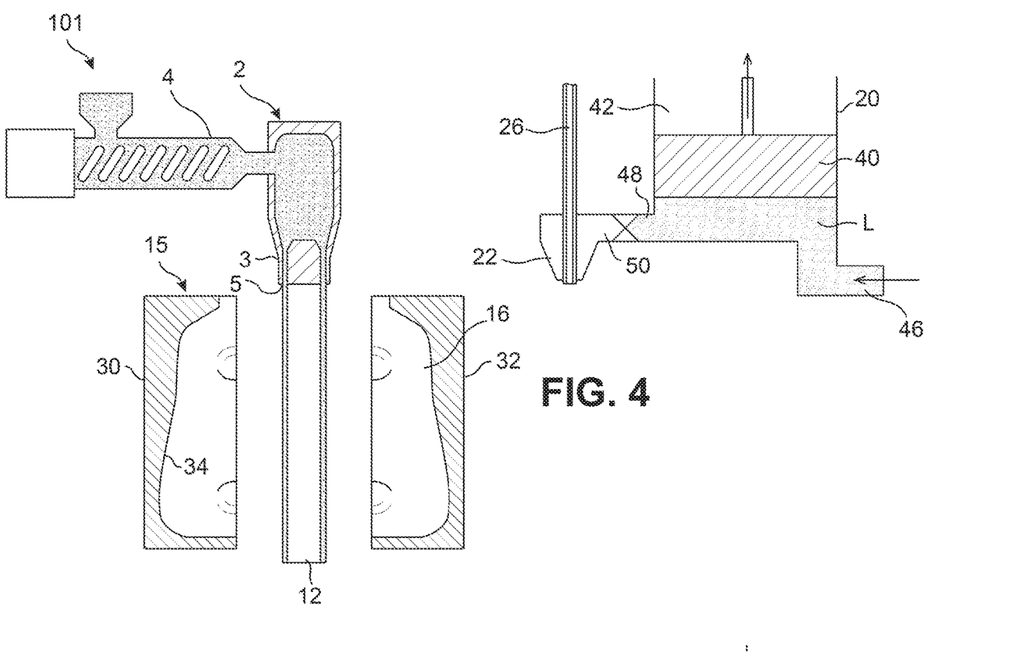
FIG. 4 is a partially schematic cross-sectional depiction of a system having an extrusion die head and an independently provided blow nozzle according to another embodiment of the invention.
Figure 5:
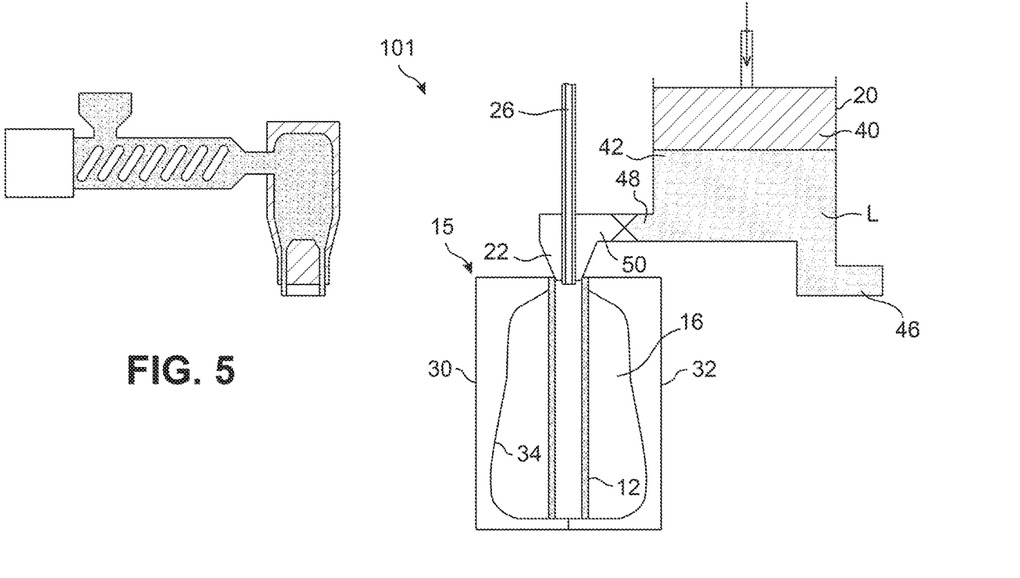
FIG. 5 is a partially schematic cross-sectional depiction of the system of FIG. 4 following a capturing of a portion of a parison within a mold and sealing engagement between the portion of the parison and the blow nozzle.
Figure 6:
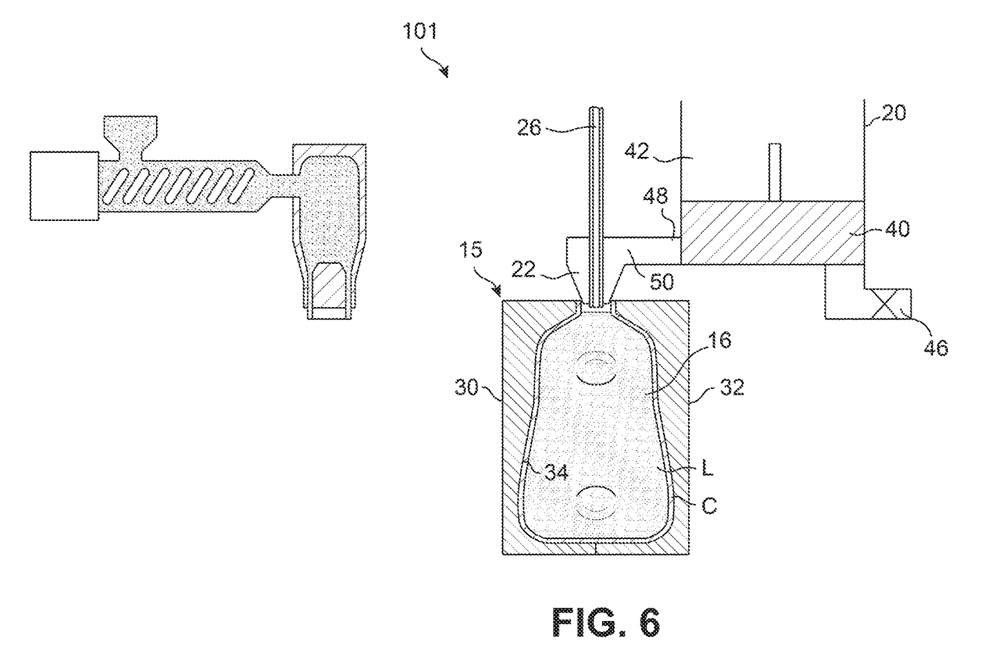
FIG. 6 is a partially schematic cross-sectional depiction of the system of FIG. 5 following an inflating of the captured portion of the parison against the mold via introduction of a liquid through the blow nozzle.
Figure 7:
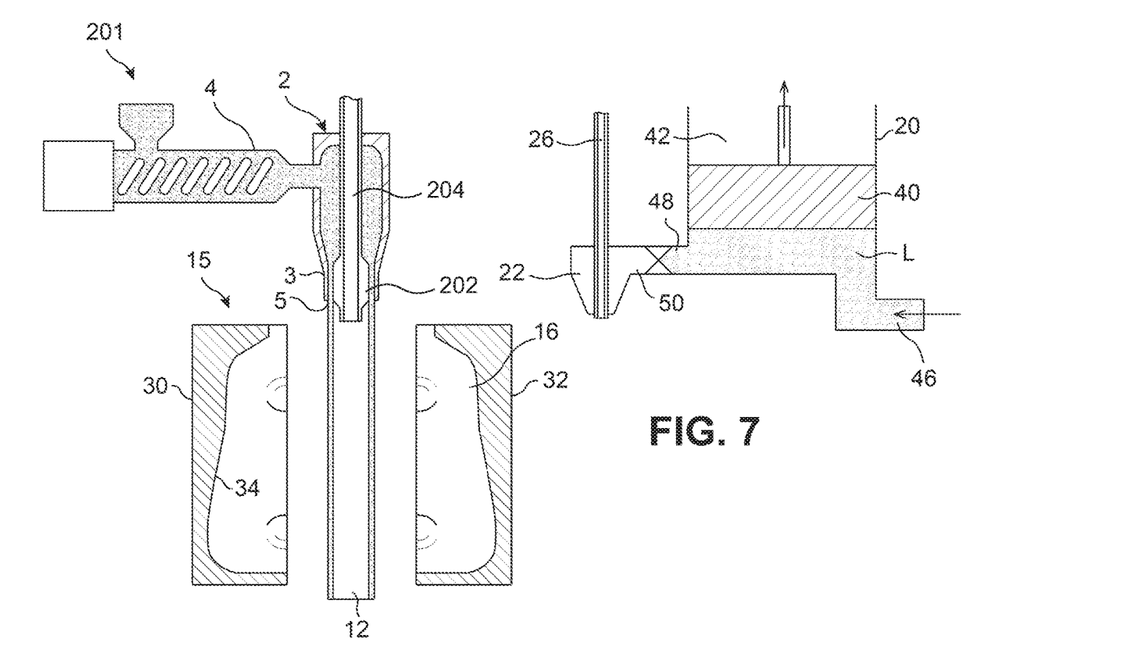
FIG. 7 is a partially schematic cross-sectional depiction of a system having an integrated extrusion die head and air nozzle and a blow nozzle according to an embodiment of the invention.
Figure 8:
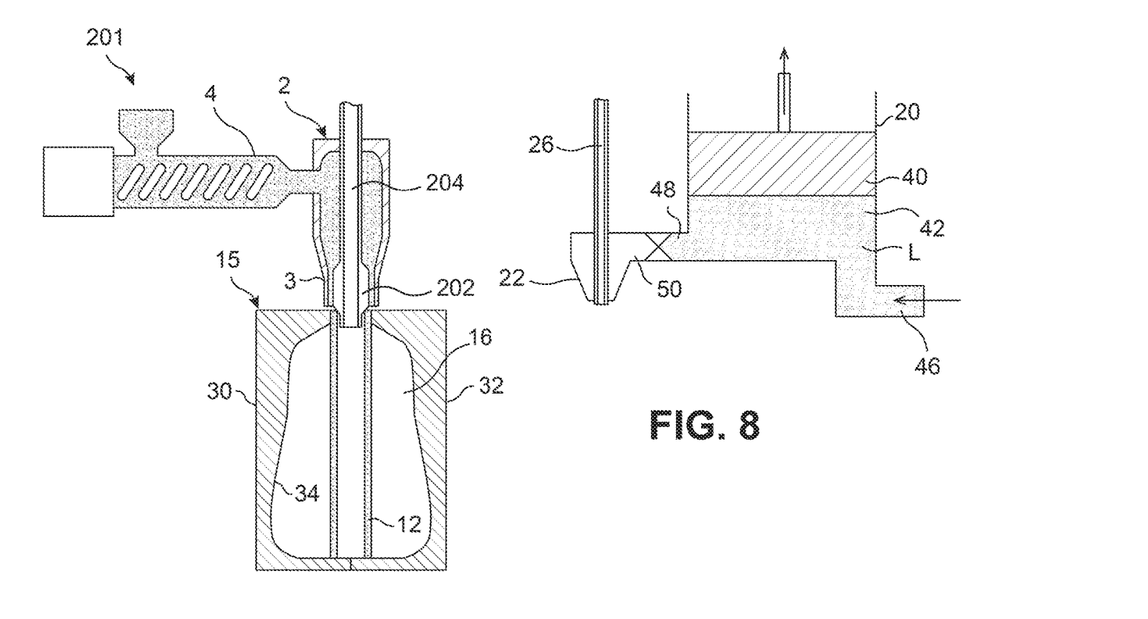
FIG. 8 is a partially schematic cross-sectional depiction of the system of FIG. 7 following a capturing of a portion of a parison within a mold and sealing engagement between the portion of the parison and the air nozzle.
Figure 9:
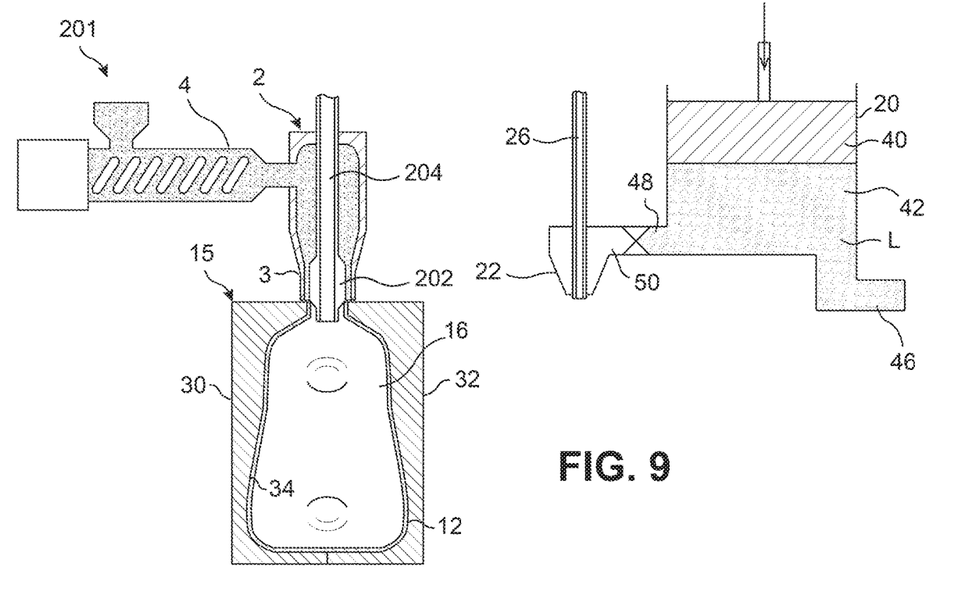
FIG. 9 is a partially schematic cross-sectional depiction of the system of FIG. 8 following an inflating of the captured portion of the parison against the mold via introduction of air through the air nozzle.
Figure 10:
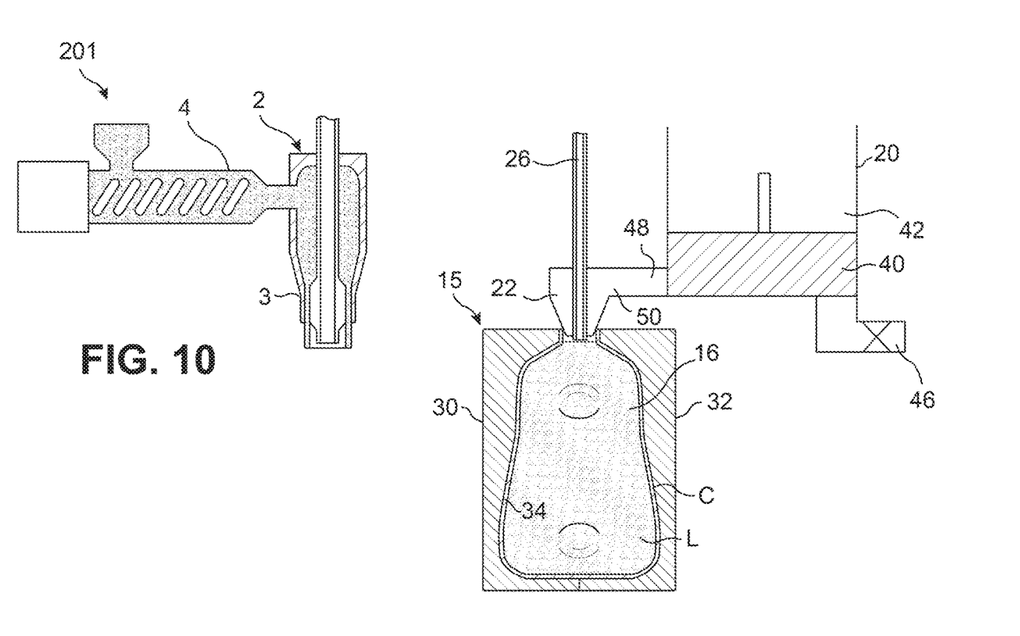
FIG. 10 is a partially schematic cross-sectional depiction of the system of FIG. 9 following the introduction of liquid into the interior of the captured portion of the parison following the inflation thereof against the mold.

In the embodiments disclosed in FIGS. 1-6, the liquid forming the end product is utilized for inflating a parison 12 used to form the resultant container against a mold 15 used in the blow molding process. Specifically, FIGS. 1-3 illustrate an embodiment wherein a blow nozzle 22 for delivering the liquid is integrated into the structure of an extrusion die head 2, whereas FIGS. 4-6 illustrate an embodiment of the invention wherein the blow nozzle 22 is provided independently and spaced apart from the extrusion die head 2 such that transport of the parison 12 and/or the blow nozzle 22 is required between subsequent steps of the manufacturing process. In contrast, the embodiment of the invention illustrated in FIGS. 7-10 utilizes a gaseous fluid such as air to inflate the parison 12 against the mold 15 before subsequently introducing the liquid acting as the end product into the inflated parison 12, wherein the liquid is introduced immediately following the inflation process and while the parison 12 is still disposed within the mold 15. The disclosed embodiments of the invention include substantially the same structural components rearranged in various different suitable configurations, hence the same reference numerals apply to those elements having a shared structure and purpose between the different disclosed embodiments.

Each of the disclosed extruding and filling systems 1, 101, 201 may utilize any of several known types of extrusion blow molding machines, such as an extrusion blow molding rotary wheel or an extrusion blow molding shuttle system. In each disclosed embodiment, an extrusion die head 2 is used to form a parison 12 of molten resin. At its lower end, the extrusion die head 2 has a die 3. Resin enters the extrusion die head 2 from a screw extruder 4 which is preferably a reciprocal screw extruder to produce intermittent extrusion of the parison 12. Alternatively, any means to produce intermittent extrusion of the parison 12 can be used. At the lower end of the die 3, an annular resin outlet 5 enables a parison 12 of the molten resin having a substantially cylindrical shape with a substantially circular cross-sectional shape to be extruded from the extrusion die head 2. The resin outlet 5 and the parison 12 may include alternative corresponding cross-sectional shapes, as desired, without departing from the scope of the present invention. The resin outlet 5 is also illustrated as extending substantially axially at the lower end of the die 3, but it is understood that the resin outlet may have a converging geometry or a diverging geometry without departing from the scope of the present invention.

Each of the disclosed systems 1, 101, 201 further includes a mold 15, a pressure source 20, a blow nozzle 22, and an air vent passageway 26. The mold 15 defines an exemplary mold cavity 16 having mold halves 30, 32 that cooperate to define an interior surface 34 corresponding to a desired outer profile of a blown container. Additionally, the mold 15 is further illustrated as having structure for introducing an opening into a central portion of the parison 12 for forming a feature such as a handle of the resultant container. The mold 15 may be moveable from an open position (see FIG. 1) to a closed position (FIG. 2) such that the extruded portion of the parison 12 is captured within the mold cavity 16. Depending on the configuration of the mold 15, the capturing of the portion of the parison 12 may include a shearing of a portion of the parison 12, such as a bottom portion of the parison 12 or the central portion of the parison 12 removed when forming the handle of the container.

As one example, the pressure source 20 can be in the form of, but is not limited to, a filling cylinder, manifold, or chamber 42 that generally includes a mechanical piston-like device 40 including, but not limited to, a piston, a pump (such as a hydraulic pump), or any other such similarly suitable device, moveable within the filling cylinder, manifold, or chamber 42. The pressure source 20 has an inlet 46 for accepting a liquid commodity L and an outlet 48 for delivering the liquid commodity L to the blow nozzle 22. It is appreciated that the inlet 46 and the outlet 48 may have valves incorporated therewith. The piston-like device 40 may be moveable in a first direction (upward as viewed in the figures) to draw liquid commodity L from the inlet 46 into the filling cylinder, manifold, or chamber 42, and in a second direction (downward as viewed in the figures) to deliver the liquid commodity L from the filling cylinder, manifold, or chamber 42 to the blow nozzle 22. The piston-like device 40 can be moveable by any suitable method such as pneumatically, mechanically, or hydraulically, for example. The inlet 46 of the pressure source 20 may be connected, such as by tubing or piping, to a reservoir or container (not shown) which contains the final liquid commodity L. It is appreciated that the pressure source 20 may be configured differently so long as a desired quantity of the liquid commodity L is delivered to the blow nozzle 22 at a desired pressure, as explained in greater detail hereinafter.

In each disclosed system 1, 101, 201, the blow nozzle 22 generally defines an inlet 50 for accepting the liquid commodity L from the outlet 48 of the pressure source 20 and an outlet 56 for delivering the liquid commodity L into the parison 12 when the parison 12 is captured within the mold cavity 16. It is appreciated that the outlet 56 may define a shape complementary to an open end of the parison 12 or an opening formed by the mold 15 such that the blow nozzle 22 may easily sealingly mate with the parison 12 and/or the mold 15 during the forming/filling process. The air vent passageway 26 formed through the blow nozzle 22 is used to initiate venting of the air contained within the interior of the parison 12 when the liquid commodity L is introduced therein and displaces the air therefrom. In other embodiments, the blow nozzle 22 may be formed by a needle (not shown) or similar puncturing mechanism suitable for penetrating the parison 12 or the resultant container formed following the inflation of the container, wherein the needle or puncturing mechanism further defines a flow path for delivering the liquid commodity L to the interior of the parison 12. The needle or puncturing mechanism may allow for the liquid to be introduced into the interior of the parison 12 and/or the finished container at any desired location thereon, such as within flash material formed during the manufacturing of the container at or adjacent a seam of the finished container.

An exemplary method of simultaneously forming and filling the container will be described initially with reference to the system 1 illustrated in FIGS. 1-3. The method includes continuously or intermittently extruding the plastic parison 12 from the extrusion die head 2, and periodically capturing a length of the extruded parison 12 within the movable mold 15 in a manner that is conventional for extrusion blow molding processes. In one example, the extrusion die head 2 extrudes the parison 12 at a temperature between approximately 465° F. to 525° F. (approximately 240° C. to 275° C.) and into the mold cavity 16 when the mold 15 is in the open position. As the parison 12 is located into the mold cavity 16, the piston-like device 40 of the pressure source 20 may begin to draw the liquid into the filling cylinder, manifold, or chamber 42 through the inlet 46. The mold halves 30, 32 of the mold cavity 16 may then close, thereby capturing the portion of the parison 12 within the mold cavity 16.

The blow nozzle 22 may then form a seal at an open end of the parison 12 and/or an open portion of the mold 15. The mold cavity 16 may be heated to a temperature between approximately 250° F. to 350° F. (approximately 93° C. to 177° C.) in order to impart increased crystallinity levels within the resultant container. In another example, the mold cavity may be provided at ambient or cold temperatures between approximately 32° F. to 90° F. (approximately 0° C. to 32° C.). The liquid may continue to be drawn into the filling cylinder, manifold, or chamber 42 by upward motion of the piston-like device 40.

Next, the piston-like device 40 may begin to drive downward (drive phase) to initiate the rapid transfer of the liquid from the filling cylinder, manifold, or chamber 42 to the interior of the captured portion of the parison 12. Again, the piston-like device 40 may be actuated by any suitable means such as pneumatic, mechanical, and/or hydraulic pressure. In one example, the hydraulic pressure within the parison 12 may reach between approximately 100 PSI to 600 PSI. The liquid causes the parison 12 to expand toward the interior surface 34 of the mold cavity 16. Because of the liquid contacting the parison 12, the parison 12 is also cooled thereby. By cooling the parison 12 with the liquid, energy costs and concerns associated with cooling the mold 15 are reduced if not eliminated.

The piston-like device 40 has completed its drive phase thereby completely transferring the appropriate volume of the liquid commodity L to the newly formed plastic container C. This creates a container blank that includes a main body portion and any other features, such as a central recess, a handle, or the like, as well as additional flash material in the areas that correspond to the seam that exists between the two mold portions and/or the flash material corresponding to the opening and/or closure portion of the container C. The liquid may be introduced into the open end of the parison 12 as shown in FIGS. 2 and 3. The container C may be sealed after the introduction of the liquid commodity L to militate against a spilling of the liquid commodity L during subsequent transport of the container C. After formation, the container blank is cooled within the mold 15 prior to removal therefrom.

The system 1 having the integrated blow nozzle 22 and extrusion die head 2 illustrated in FIGS. 1-3 provides the advantage of requiring fewer components while also removing the need to shuttle the mold 15 and/or the blow nozzle 22 from one component to another, thereby simplifying operation of the system 1. The immediate transition from the capturing of the parison 12 to the inflation of the parison 2 via an integrated structure also reduces an amount of time the interior of the parison 12 is exposed to the introduction of debris or other contaminants during the manufacturing of the resultant container C. The blow nozzle 22 is shown as extending axially through the extrusion die head 2 while arranged concentrically relative to the resin outlet 5, but any configuration suitable for directing the liquid commodity L to a position disposed radially inwardly of the resin outlet 5 may be utilized for the blow nozzle 22 without necessarily departing from the scope of the present invention. The blow nozzle 22 may be routed through the extrusion die head 2 in a manner preventing interference with the flow of the extruded plastic adjacent the resin outlet 5, as desired.

The system 101 illustrated in FIGS. 4-6 includes substantially identical structure to the system 1 with the exception of the separation of the extrusion die head 2 from the blow nozzle 22. As such, the mold 15 may be in need of shuttling between a position in axial alignment with the extrusion die head 2 to a position in axial alignment with the blow nozzle 22 between subsequent steps of a forming and filling process performed by the system 101. Specifically, the mold 15 may be positioned in alignment with the extrusion die head 2 while in the open position before being moved to the closed position in order to capture the portion of the parison 12 when a sufficient length of the parison 12 has been extruded from the extrusion die head 2. Following the capturing of the parison 12, the mold 15 is transported to the position in alignment with the blow nozzle 22 to facilitate the sealing engagement between the blow nozzle 22 and the parison 12 and/or mold 15. During the capturing of the parison 12 and the transport of the mold 15, the piston-like device 40 of the pressure source 20 may begin an upstroke to facilitate the entry of the liquid commodity L into the chamber 42. The piston-like device 40 may then perform the downstroke thereof to introduce the pressurized liquid L into the interior of the parison 12 following sealing engagement of the blow nozzle 22 thereto. The introduction of the pressurized liquid causes the inflation of the parison 12 against the interior surface 34 defining the mold cavity 16. Following the inflation of the parison 12, the mold 15 may be moved once again to the open position in order to release the resultant container blank. The mold 15 may then be repositioned in alignment with the extrusion die head 2 when in the open position to prepare the mold 15 for capturing the next length of the extruded parison 12 projecting out of the extrusion die head 2.

The system 201 illustrated in FIGS. 7-10 includes substantially identical structure to the system 101, except for the introduction of an air nozzle 202 within the extrusion die head 2. The combined extrusion die head 2 and air nozzle 202 assembly is accordingly configured to extrude the parison 12 as well as to inflate the parison 12 while captured within the mold 15. The air nozzle 202 includes an annular or cylindrical air passageway 204 through which the air can be introduced into the parison 12 during the expansion thereof and subsequently vented from the interior of the parison 12 following the completion of the molding process. The air passageway 204 extends upward through the extrusion die head 2 to a coupling (now shown) where it is attached to a two directional valve that intermittently connects to a source of pressurized air and to the atmosphere to blow mold and vent the blown container, respectively.

The air nozzle 202 is configured to sealingly engage the open end of the parison 12 or the open end of the mold 15 in order to introduce the pressurized air into the interior of the parison 12. Following the inflation of the parison 12 against the mold 15, the mold 15 is shuttled to a position in alignment with the blow nozzle 22 while the inflated parison 12 remains therein. The blow nozzle 22 then sealingly engages the parison 12 and/or the mold 15 in order to introduce the liquid commodity L into the interior of the already inflated parison. The introduction of the liquid cools the parison 12 within the mold 15 while also potentially disinfecting the liquid via the contact with the heated parison 12.

The system 201 may accordingly include the introduction of the liquid commodity L into the parison 12 after inflation thereof using the pressurized air, as known in the prior art, but prior to being ejected from the mold 15. In contrast to the sealing engagement of the blow nozzle 22 described hereinabove, the liquid may be introduced by piercing the parison 12, such as through a portion of the corresponding flash material, before introducing the liquid commodity to the interior of the parison 12 through a pierced opening of the parison 12. Alternatively, the liquid may be introduced into the container during transport away from the mold 15 for further processing, as desired.

Regardless of the system 1, 101, 201 utilized, the container C may be subsequently subjected to a flash trimming process in order to remove the flash formed at any seams of the resultant container C. Specifically, if the container C has a handle or otherwise includes a central opening or recess, the material formed along the central opening is removed during the flash trimming process. Flash material is also trimmed from the areas that correspond to the remaining seam or seams between the two mold halves 30, 32, including the flash material from the bottom portion of the container C and the flash material adjacent the opening and/or closure portion of the container C. In another embodiment of the invention, the container C is filled with the liquid simultaneously with the flashing trimming process or immediately thereafter, but in the same mold or machine in which the flash trimming process occurs.

After deflashing, the container C may be tested for leaks. Such leak detection processes may include the introduction of pressurized gas into the container C to determine whether a leak exists. In another embodiment of the invention, the liquid may be introduced into the container C after the leak detection occurs and the container C is deemed leak free. Lastly, the container C is capped with a closure and distributed to consumers.

In the embodiment of the invention wherein the container is pressurized and formed using the liquid, the combination of both the blow and filling processes into one piece of equipment may reduce handling parts and therefore lead to reduced capital cost per resultant plastic container. In addition, the space required by a process that simultaneously blows and fills the resultant plastic container may be significantly reduced over the space required when the processes are separate. This may also result in lower infrastructure cost.

Integrating the blowing and filling processes into a single process eliminates the need to ship bottles. The shipping of bottles is inherently inefficient and expensive. Shipping raw plastic materials as pellets or flakes, on the other hand, is much more efficient.

Integrating the two processes into a single step may reduce labor and additional costs (both capital and expense) associated with handling bottles after they are produced and before they are filled.

In the exemplary method described herein, the parisons are formed at elevated temperatures, perhaps in excess of 545° F. (282° C.), and the containers formed therefrom may be immediately filled and capped. In this way, the opportunity for an empty container to be exposed to the environment where it might become contaminated is greatly reduced. As a result, the cost and complexity of aseptic filling may be greatly reduced.

The process described herein may eliminate intermediary work in process and therefore may avoid the cost associated with warehousing and/or container silos and/or forklifts and/or product damage, etc. In addition, without work in process inventory, the overall working capital may be reduced.

As blowing and filling are integrated closer but remain as two separate processes (such as conventional methods of forming and subsequently filling), the overall efficiency of such a system is the product of the individual efficiencies of the two parts. The individual efficiencies may be driven largely by the number of transitions as parts move through the machines. Integrating the two processes into one may provide the opportunity to minimize the number of transitions and therefore increase the overall process efficiency.

Many beverages, including juices, teas, beer, etc., are sensitive to oxygen and need to be protected when packaged. Many plastics do not have sufficient barrier characteristics to protect the contents from oxygen during the life of the packaged product. There are a number of techniques used to impart additional barrier properties to the container to slow down oxygen transmission and therefore protect the package contents. One of the most common techniques is to use an oxygen scavenger in the bottle wall. Such a scavenger may be molded directly into the parison. The relatively thick wall of the parison protects the scavenger from being consumed prior to blowing it into a container. However, once the container has been blown, the surface area of the wall increases and the thickness decreases. As such, the path that the oxygen has to travel to contact and react with the active scavenging material is much shorter. Significant consumption of oxygen scavengers may begin as soon as the container is blown. If the container is formed and filled at the same time, then the scavenger is protecting the product through its entire useful life and not being consumed while the container sits empty waiting to be filled.

The method described herein may be particularly useful for filling applications such as isotonic, juice, tea, and other commodities that are susceptible to biological contamination. As such, these commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well, there is always the risk of a bacterial contaminant breaking through the operational defenses and contaminating the product.

In North America, one predominant method for filling contaminant susceptible beverages is through hot filling. In this process, the beverage is introduced to the container at a temperature that will kill any bacteria that is present. The container may be sealed while the product is hot. One drawback to this technology is that the containers usually need to be heavy to sustain the elevated filling temperature and the vacuum that eventually develops in the container as the product cools. As well, the blow process is somewhat more complex and therefore more costly than non-heat set blow molding. The disclosure described herein offers the opportunity to dramatically reduce the cost and complexity of filling sensitive foods and beverages. By combining the blowing and filling processes, there is an ability to heat the parison to well over 212° F. (100° C.) for a sufficient period of time necessary to kill any biological contaminants. If a sterile product is used as the container forming medium and then immediately sealed, the process may result in a very inexpensive aseptic filling process with very little opportunity for contamination.

There are many other bottled products where this technology may be applicable. Products such as dairy products, liquor, household cleaners, salad dressings, sauces, spreads, syrups, edible oils, personal care items, and others may be bottled utilizing such methods. Many of these products are currently in blow molded PET containers but are also in extrusion molded plastic containers, glass bottles, and/or cans. This technology has the potential of dramatically changing the economics of package manufacture and filling.

While much of the description has focused on the production of PET containers, it is contemplated that other polyolefin materials (e.g., polyethylene, polypropylene, etc.) as well as a number of other plastics may be processed using the teachings discussed herein.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A method of making a container, comprising:
   extruding a parison;
   capturing a portion of the parison within a mold; and
   inflating the portion of the parison against the mold by introducing a pressurized liquid into an interior of the portion of the parison to form a resultant container, wherein the inflating of the portion of the parison includes sealingly engaging a blow nozzle to the portion of the parison and the pressurized liquid is introduced into the portion of the parison by piercing the portion of the parison with the blow nozzle.

2. The method of claim 1, wherein the liquid forms an end product disposed within the resultant container.

3. The method of claim 1, further comprising a step of sealing an open end of the resultant container with the liquid disposed therein following the inflating step.

4. The method of claim 1, further comprising a step of trimming flash from the resultant container following the inflating step.

5. The method of claim 1, wherein the blow nozzle pierces through flash material of the portion of the parison.

6. The method of claim 1, wherein the blow nozzle is used to introduce the pressurized liquid into the interior of the portion of the parison and an extrusion die head is used to extrude the parison.

7. The method of claim 6, wherein the blow nozzle and the extrusion die head are intergrated into a common structure.

8. The method of claim 6, wherein the blow nozzle and the extrusion die head are spaced apart from each other.

9. The method of claim 1, wherein the parison is extruded at a temperature between 465° F. to 525° F.

10. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein the inflating of the portion of the parison includes sealingly engaging a blow nozzle to the portion of the parison and the pressurized liquid is introduced into the interior of the portion of the parison at a pressure between 100 PSI and 600 PSI.

11. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein the pressurized liquid has a temperature lower than a temperature of the portion of the parison when the pressurized liquid is introduced into the portion of the parison, the pressurized liquid decreasing the temperature of the portion of the parison to initiate solidifying of the portion of the parison into the resultant container.

12. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein the portion of the parison has a temperature greater than a temperature of the pressurized liquid when introduced into the interior of the portion of the parison, the portion of the parison increasing the temperature of the liquid to initiate a disinfecting thereof.

13. A method of making a container, comprising:
    extruding a parison;
    capturing a portion of the parison within a mold;
    inflating the portion of the parison against the mold by introducing a pressurized liquid into an interior of the portion of the parison to form a resultant container; and
    heating the mold following the introduction of the pressurized liquid into the interior of the portion of the parison, the heating of the mold initiating a disinfecting of the liquid.

14. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein the mold is configured to form an opening or recess in a central region of the portion of the parison for forming a handle of the resultant container.

15. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein a pressure source is used for inflating the portion of the parison against the mold, the pressure source including a chamber having a piston moveable therein.

16. The method of claim 15, wherein movement of the piston in a first direction causes the liquid to be drawn into the chamber and movement of the piston in a second direction causes the liquid to be expelled from the chamber and introduced into the interior of the portion of the parison.

17. A method of making a container, comprising:
    extruding a parison;
    capturing a portion of the parison within a mold; and
    inflating the portion of the parison against the mold by introducing a pressurized liquid into an interior of the portion of the parison to form a resultant container, wherein the mold is heated to a temperature between 250° F. to 350° F. prior to the introduction of the pressurized liquid in order to impart increased crystallinity levels within the resultant container.

\* \* \* \* \*